United States Patent
Fischer

[19]

[11] Patent Number: 6,111,402
[45] Date of Patent: Aug. 29, 2000

[54] POSITION MEASURING INSTRUMENT HAVING A SCANNING ELEMENT WITH MULTIPLE SCANNING TRACKS

[75] Inventor: Peter Fischer, Bernau am Chiemsee, Germany

[73] Assignee: Dr. Johannes Heidenhain GmbH, Traunreut, Germany

[21] Appl. No.: 08/977,706

[22] Filed: Nov. 25, 1997

[30] Foreign Application Priority Data

Nov. 29, 1996 [DE] Germany .................. 196 49 504

[51] Int. Cl.[7] .................. G01B 7/30; G01D 5/20; H01F 21/02; H01F 21/06
[52] U.S. Cl. .................. 324/207.17; 324/207.25; 340/870.32; 341/15; 336/45; 336/79
[58] Field of Search .................. 324/173, 174, 324/207.17–207.19, 207.22–207.25; 318/653, 661; 341/15; 340/870.32–870.36; 336/45, 75, 77, 79, 130, 132, 200

[56] References Cited

U.S. PATENT DOCUMENTS

| | | | |
|---|---|---|---|
| 3,197,763 | 7/1965 | Fisher | 341/15 |
| 3,281,826 | 10/1966 | Moffitt | 341/15 X |
| 3,810,136 | 5/1974 | Lang et al. | 341/15 X |
| 3,812,481 | 5/1974 | Stednitz | 340/870.32 |
| 4,313,151 | 1/1982 | Vranken | 336/200 X |
| 4,612,502 | 9/1986 | Spies . | |
| 4,697,144 | 9/1987 | Howbrook | 324/207.17 |
| 4,737,698 | 4/1988 | McMullin et al. . | |
| 4,764,767 | 8/1988 | Ichikawa et al. | 324/207.22 X |
| 4,820,961 | 4/1989 | McMullin . | |
| 4,853,631 | 8/1989 | Carmen | 341/15 X |
| 4,985,691 | 1/1991 | Pulyer et al. | 336/130 |
| 5,109,223 | 4/1992 | Schmitt et al. . | |
| 5,430,374 | 7/1995 | Metz . | |
| 5,475,302 | 12/1995 | Mehnert et al. | 324/207.17 |
| 5,619,132 | 4/1997 | Spies . | |
| 5,627,466 | 5/1997 | Spies et al. . | |
| 5,841,274 | 11/1998 | Masreliez et al. | 324/207.17 |
| 6,011,389 | 1/2000 | Masreliez et al. . | |

FOREIGN PATENT DOCUMENTS

| | | |
|---|---|---|
| 0 182 085 | 5/1986 | European Pat. Off. . |
| 0 289 033 | 11/1988 | European Pat. Off. . |
| 0 743 508 | 11/1996 | European Pat. Off. . |
| 4021637 | 1/1992 | Germany . |
| 195 04 307 | 8/1996 | Germany . |
| WO 97/19323 | 5/1997 | WIPO . |

*Primary Examiner*—Gerard Strecker
*Attorney, Agent, or Firm*—Brinks Hofer Gilson & Lione

[57] ABSTRACT

A scanning element for a position measuring instrument. The scanning element includes a first scanning track disposed within a first region and a second scanning track disposed adjacent to the first scanning track within a second region. An electromagnetic field generator generates a homogeneous electromagnetic exciting field within the first region and the second region.

63 Claims, 4 Drawing Sheets

POSITION MEASURING INSTRUMENT HAVING A SCANNING ELEMENT WITH MULTIPLE SCANNING TRACKS

Applicant claims, under 35 U.S.C. § 119, the benefit of priority of the filing date of Nov. 29, 1996 of a German patent application, copy attached, Serial Number 196 49 504.0, filed on the aforementioned date, the entire contents of which are incorporated herein by reference.

BACKGROUND OF THE INVENTION

1. Field of the Invention

The present invention relates to a scanning element for a position measuring instrument.

2. Discussion of Related Art

In addition to position measuring instruments in which a periodic scale is optically scanned to obtain position-dependent information, measuring systems are known that are based on alternative scanning principles. Such position measuring instruments prove to be less vulnerable, especially under certain environmental conditions, than the aforementioned optical measuring systems. Such environmental conditions exist for instance in applications in which the rotary motion of the shaft of a drive mechanism is to be detected. A position measuring instrument which can be used even under relatively rough environmental conditions is described for instance in European patent disclosure EP 0 289 033 B1. In it, a scale track of alternatingly arranged electrically conductive and nonconductive regions is scanned inductively. The corresponding scanning element to that end has one or more exciting coils, which, in the region of the scanned scale track, generate a homogeneous electromagnetic field. On the scanner side, sensor windings are also provided, which are also disposed in the homogeneous field of the exciting coils and serve to detect the electromagnetic fields induced in the conductive regions of the scale track, so that an output signal modulated as a function of displacement results. In this way, the relative motion between the scale track and the scanning element can be detected. In terms of the functional principle of such a position measuring instrument, reference may also be made to European Patent Disclosure EP 0 182 085.

A similarly designed inductive position measuring instrument is also known from German Patent Disclosure DE 195 04 307. There it is proposed, among other things, not merely to scan a single scale track but instead to provide further tracks that can be read out in the manner described. Details of the concrete embodiment of a measuring arrangement with a plurality of scanned scale tracks and possibilities for generating the exciting fields, however, are not disclosed in this reference.

Another inductive position measuring instrument that operates by the principles mentioned above is also known from European Patent Disclosure EP 0 743 508 A2. Once again, however, this reference provides no indication of how in the case of a plurality of scanned scale tracks, for instance, the scanning element should be concretely designed. In particular, there is no indication how for the various scanning tracks the generation of the most homogeneous possible exciting fields might be accomplished.

An object of the present invention is therefore to embody a scanning element of this generic type for an inductive position measuring instrument in such a way that even if a plurality of scanning tracks are provided, reliable functioning is assured. In particular, even for a plurality of scanning tracks, the generation of homogeneous exciting fields in the region of the various scanning tracks should be assured.

SUMMARY OF THE INVENTION

A first aspect of the present invention regards a scanning element for a position measuring instrument. The scanning element includes a first scanning track disposed within a first region and a second scanning track disposed adjacent to the first scanning track within a second region. An electromagnetic field generator generates a homogeneous electromagnetic exciting field within the first region and the second region.

A second aspect of the present invention regards a position measuring instrument for generating position-dependent outputs signals. The instrument includes a scale and a scanning element moving relative to the scale. The scanning element includes a first scanning track disposed within a first region and a second scanning track disposed adjacent to the first scanning track within a second region. An electromagnetic field generator generates a homogeneous electromagnetic exciting field within the first region and the second region.

The provisions according to the invention now assure that even in the case of a plurality of adjacently disposed scanning tracks, the sensor windings of all the scanning tracks provided are disposed in a homogeneous electromagnetic field. By the suitable interconnection of the exciting elements, a homogeneous exciting field can be generated in a simple way in the region of each of the various scanning tracks. Various scanning tracks can be provided for the most various purposes, such as using one scanning track for drive commutation, another for incremental position determination, and so forth.

It proves to be advantageous to embody the exciting elements in the form of conductor track units, comprising a plurality of parallel individual conductor tracks through which current flows. In conjunction with the multilayered structure of the scanning element, it is possible in particular in this way to assure a compact design of the scanning element or of the complete position measuring instrument. Advantageously, known techniques from printed circuit board production can be used; that is, simple manufacture of a scanning element embodied according to the invention is possible.

With regard to the generation of the homogeneous exciting fields according to the invention in the region of the scanning tracks, a number of interconnection possibilities exist; that is, the scanning element according to the invention can be flexibly adapted to various measurement demands. It is understood that the provisions according to the invention can moreover be used both in linear and rotational position measuring instruments; their use in the most various measuring systems is also possible, that is, both in absolute and in incremental measuring systems of the most various design and in corresponding combinations among them.

Further advantages and details of the scanning element according to the invention will become apparent from the ensuing description of an exemplary embodiment in conjunction with the accompanying drawings.

DESCRIPTION OF THE PREFERRED EMBODIMENT

Figure 1:
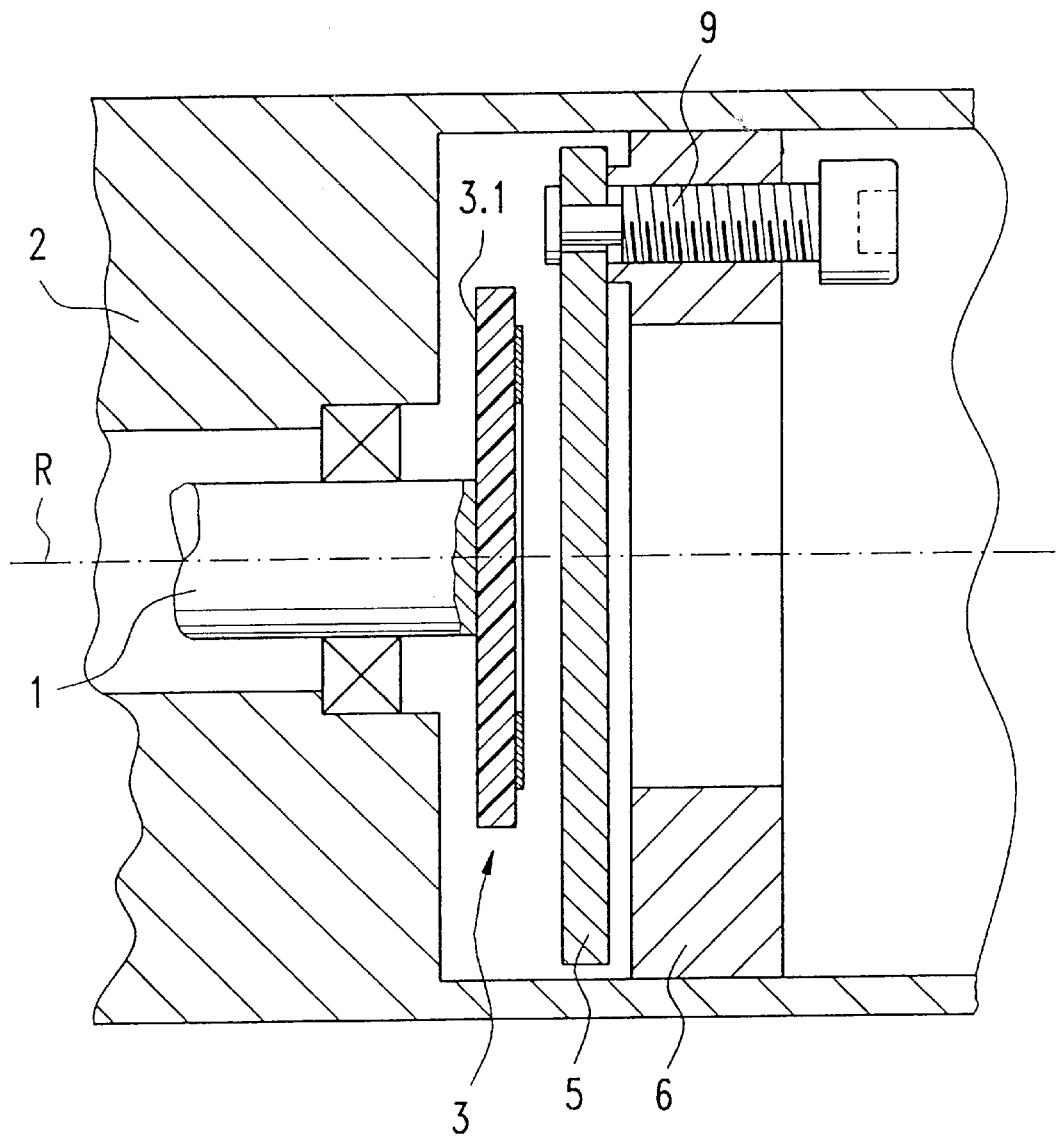
FIG. 1 shows a lateral sectional view of an inductive position measuring instrument having the scanning element embodied according to the present invention.

A lateral sectional view through an embodiment of an inductive position measuring instrument, in which a scanning element embodied according to the invention is used, is shown in FIG. 1. The position measuring instrument shown is embodied as an angle measuring instrument, which is used to detect the rotational angle of the shaft 1 of a drive mechanism relative to a stationary drive element 2. The reference letter R indicates the axis of rotation of the shaft 1 in FIG. 1; no other drive details are shown. A scale disk 3 is secured to the shaft 1 of the drive mechanism and is scanned with the aid of the stationary scanning element 5 embodied according to the invention. The scale disk 3, rotating with the shaft 1 about the axis of rotation R, comprises a scale carrier 3.1, on which two radially adjacent scale tracks are disposed. The scanning element 5 is secured in the housing or stationary part 2 of the drive mechanism on a mounting element 6 via a screw 9. Not shown in FIG. 1 is an evaluation and supply unit disposed following the scanning element 5. This unit is used on the one hand to supply the scanning element 5, or the exciting element disposed on it, with a supply voltage, and on the other to evaluate the periodically modulated, position-dependent output signals of the scanning element 5 that result from the scanning of the scale disk 3. Such an evaluation and supply unit may be embodied for instance in the form of a numerical control.

Along with the relative arrangement of the measuring system shown in FIG. 1, with the rotating scale disk 3 and the stationary scanning element 5, it is understood that a position measuring system with a stationary scale disk and a rotating scanner unit based on the concepts of the invention is equally feasible.

For a detailed explanation of the fundamental functional principle of such a position measuring instrument, reference is made here to EP 0 182 085 B1, already mentioned at the outset.

Figure 2:
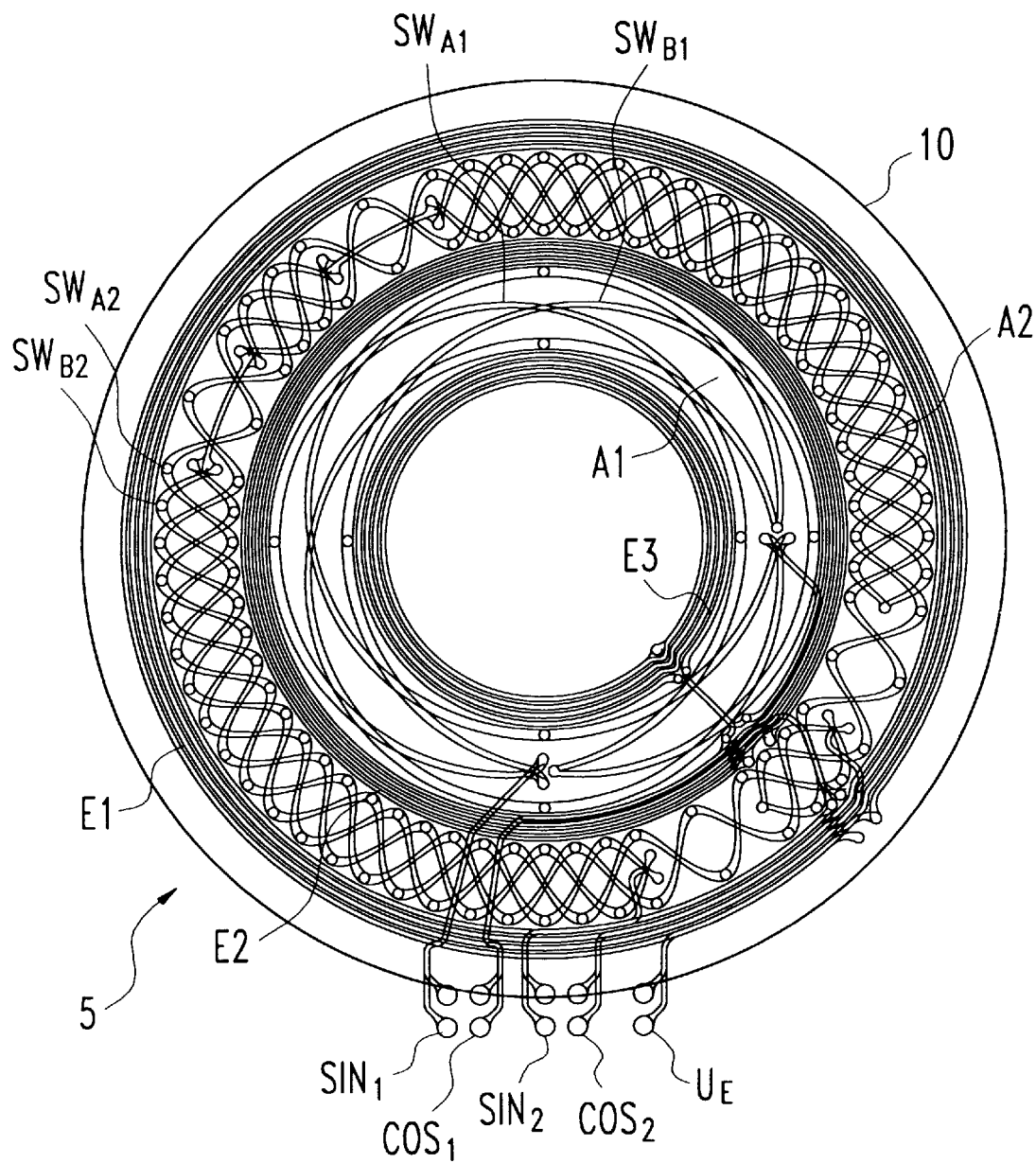
FIG. 2 shows a plan view of the embodiment of the scanning element according to the invention used in the position measuring instrument of FIG. 1.

A description of the scanning element 5 embodied according to the invention and of the scale disk 3 both from the exemplary embodiment shown in FIG. 1 will now be made in conjunction with FIGS. 2 and 3. FIG. 2 shows a front view of the scanning element 5; the scale disk 3 scanned with it is also shown in a front view in FIG. 3.

Figure 3:
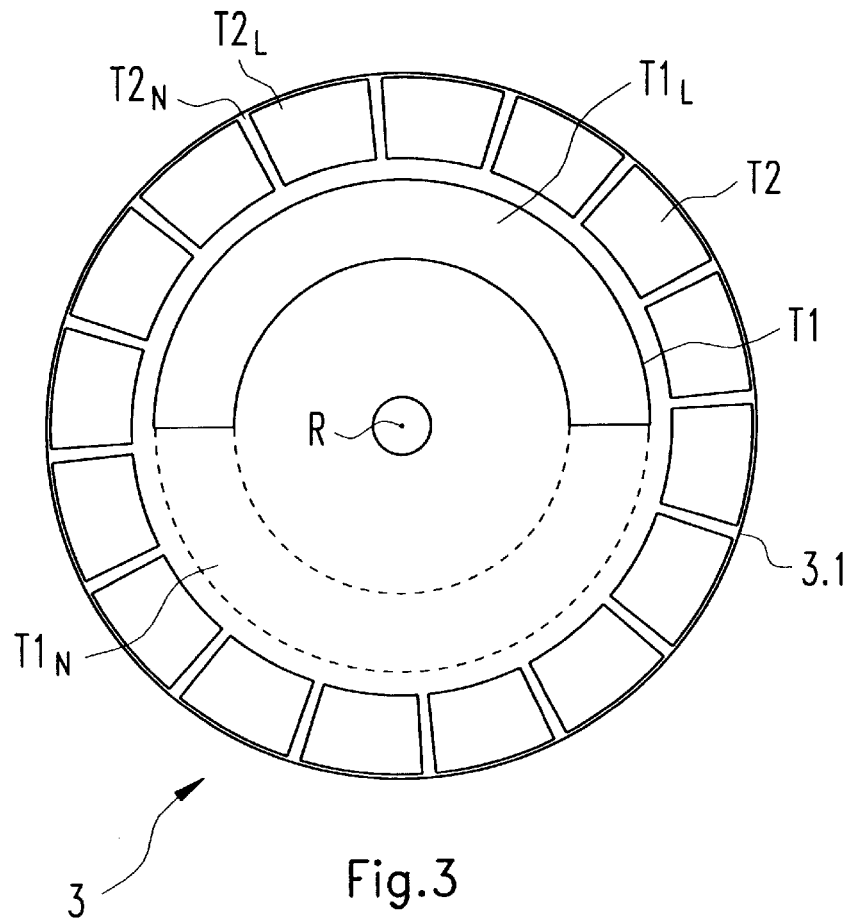
FIG. 3 shows a plan view of the scale carrier, scanned with the scanning element of FIG. 2, including the two scale tracks provided.

In the exemplary embodiment of FIGS. 1–3, it is provided here that with the aid of the scanning element 5, a total of two radially adjacent scale tracks T1, T2 on the scale disk 3 are scanned inductively. The two scale tracks T1, T2 are embodied as circles and are arranged radially adjacent one another on a scale carrier 3.1. Epoxy material is used in the exemplary embodiment shown as material for the scale carrier 3.1. The two scale tracks T1, T2 each comprise a periodic succession of alternatingly arranged electrically conductive scale regions $T1_L$, $T2_L$ and nonconductive scale regions $T1_N$, $T2_N$. Copper applied to the scale carrier 3.1 proves to be a suitable material for the electrically conductive scale regions $T1_L$, $T2_L$. By comparison, in the nonconductive scale regions $T1_N$, $T2_N$, the scale carrier 3.1 has not been coated and is identical with the material of the scale carrier 3.1.

The inner scale track T1, in the embodiment shown, comprises merely a first semicircular segment or scale region $T1_L$ with electrically conductive material and a second semicircular segment or scale region $T1_N$ in which no conductive material is disposed. Scanning of the scale track T1 using the scanning element 5 described below results in relatively coarse absolute position information within one revolution of the scale disk 3 about the axis R.

Radially adjacent to the first scale track T1, a second scale track T2 is disposed on the scale carrier 3.1, comprising many electrically conductive scale regions $T2_L$ and between them scale regions $T2_N$. The various scale regions $T2_L$, $T2_N$ are embodied in terms of material in the same way as the scale region $T1_L$ of the first scale track T1.

In the exemplary embodiment shown, the second scale track T2 includes a total of 16 periodically disposed electrically conductive scale regions $T2_L$ and correspondingly 16 nonconductive scale regions $T2_N$ disposed between them. The length of the electrically conductive scale regions $T2_L$ in the measuring direction is more than 10 times greater than the corresponding length of the nonconductive scale regions $T2_N$; that is, a ratio other than 1:1 between the lengths of the various scale regions is preferably selected in this scale track. Accordingly, scanning of the second scale track T2 produces a resultant incremental signal in the relative motion of the scale disk 3 and the scanning element 5. In combination with the absolute position determination via the first scale track T1, a high-resolution determination of rotational angle is possible by way of such an arrangement.

In addition to the combination, chosen in this exemplary embodiment, with two separate scale tracks T1, T2, each of which enables both an absolute position determination and an incremental position determination, it is understood that other combinations are also possible, such as the embodiment of a code scale disk with a plurality of different tracks, and so forth. Moreover, the incremental scale track can also be embodied in a modified form, that is, with different scale ratios. In addition, a plurality of parallel adjacent incremental scale tracks with different periodicities of the scale ratios, for instance, may be used, and so forth.

The scanning element 5 according to the invention, shown in FIG. 2 and intended for scanning the scale disk 3, includes two scanning tracks A1, A2, which are assigned to the scale tracks T1, T2 and are likewise embodied as circles and disposed radially adjacent one another on a carrier element 10. For the sake of easier comprehension, the following description will refer to only a single carrier element 10, although in the embodiment of the scanning element 5 shown there is a multilayer structure thereof with a plurality of printed circuit board layers, connecting layers, and sensor layers. With regard to this multilayer construction, see the description of FIG. 6.

The scanning track A1 associated with the inner or absolute scale track T1, in the exemplary embodiment shown, comprises a total of at least two flatly embodied sensor windings $SW_{A1}$ and $SW_{B1}$, which when scanning each furnish one single signal period over the circumference of the scanning track A1.

The two sensor windings $SW_{A1}$ and $SW_{B1}$ are offset relative to one another on the carrier element 10 of the scanning element 5, so that on the output side when the rotating scale disk 3 is scanned, two output signals $SIN_1$, $COS_1$ result, which have a phase offset of 900 from one another. Both output signals $SIN_1$, $COS_1$, as already noted, furnish an unequivocally absolute position signal within one revolution of the shaft 3 of the drive mechanism. Via the known evaluation of the phase-quadrature signals $SIN_1$, $COS_1$, a directional detection in the rotary motion is assured as well. In FIG. 2, the corresponding signal pickups of the scanning element 5 are shown, including the associated output signals of the various scanning tracks A1, A2.

The second scanning track A2, suitable for scanning the second scale track T2, likewise includes two flat sensor windings $SW_{A2}$, $SW_{B2}$, which are disposed on the carrier element 10. Once again, a relative offset is provided between the two sensor windings $SW_{A2}$, $SW_{B2}$, so that on the output side the two signals $SIN_2$, $COS_2$ result from the scanning of the second scale track T2, and there is a 90° phase offset or phase quadrature between them. Over the entire circumference of the second scanning track A2, there are many sensor windings $SW_{A2}$ and $SW_{B2}$ disposed on the carrier element 10.

The sensor windings $SW_{A1}$, $SW_{B1}$, $SW_{A2}$, $SW_{B2}$ of the two scanning tracks A1 and A2 are made from copper; the carrier element is made of epoxy material. Overall, the scanning element 5 according to the invention is embodied with multiple layers, which can be achieved for instance by known printed circuit board technology. For details of the multilayer construction, reference is made to the description hereinafter of FIG. 6.

In addition to the sensor windings $SW_{A1}$, $SW_{B1}$, $SW_{A2}$, $SW_{B2}$ in the two scanning tracks A1, A2, the scanning element 5 embodied according to the invention also includes exciting elements E1–E3, each disposed laterally adjacent the respective scanning tracks A1 and A2 on the carrier element 10. The exciting elements E1–E3 are used for the requisite generation of a homogeneous electromagnetic exciting field in the region of the scanning tracks A1 and A2 and in the region of the scale tracks T1 and T2 scanned therewith. In the exemplary embodiment shown, the exciting elements E1–E3 are embodied as conductor track units, each of which includes a plurality of conductor tracks through which current flows, the tracks being disposed plane-parallel on the carrier element 10. If the conductor tracks of a conductor track unit all experience a flow of current through them in the same direction, then a tubular or cylindrically oriented electromagnetic field forms around the respective conductor track unit. The field lines of the resultant electromagnetic field extend in the form of concentric circles around the conductor track units; the direction of the field lines depends in a known manner on the direction of current in the conductor track units.

The direction of current in the conductor track units immediately adjacent a common scanning track, or the corresponding interconnection of these conductor track units, should be selected in opposite directions, so that the field lines in the region of the scanning tracks are each oriented identically. Supplying the conductor track units E1–E3 with a supply voltage is done via the supply voltage pickups $U_E$, also shown in FIG. 2. To enable this kind of field generation, a specific conductor track course on the carrier element 10 is required, which will be described below in conjunction with FIG. 4.

Figure 4:
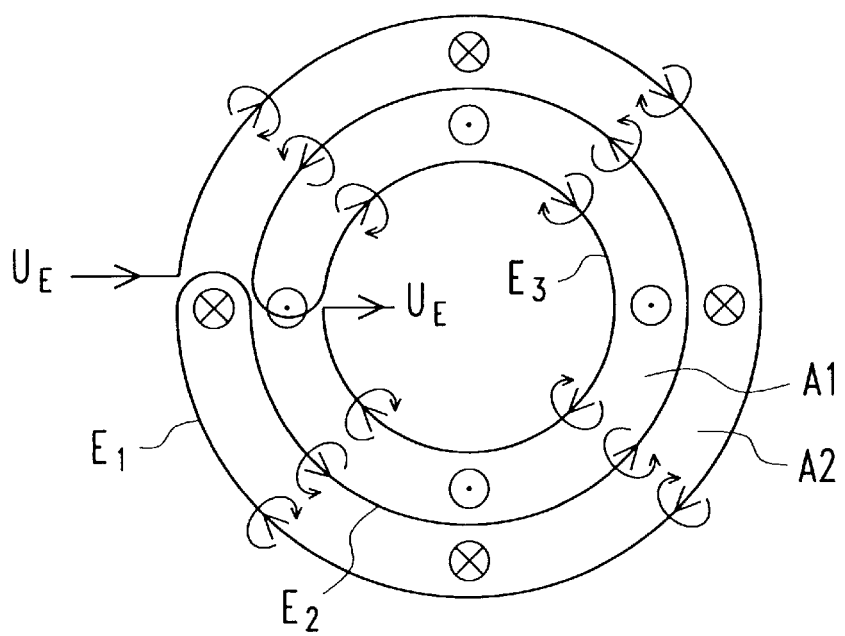
FIG. 4 shows a schematic illustration explaining the exciting field generation according to the present invention.
Figure 5A:
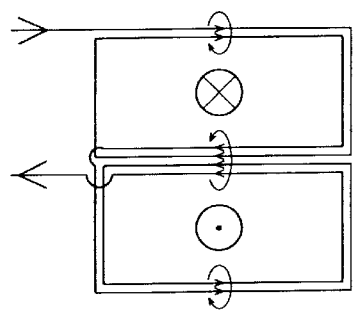
FIGS. 5a–5e each show an alternative possibility for generating the exciting fields for two adjacently disposed scanning tracks according to the present invention.
Figure 5B:
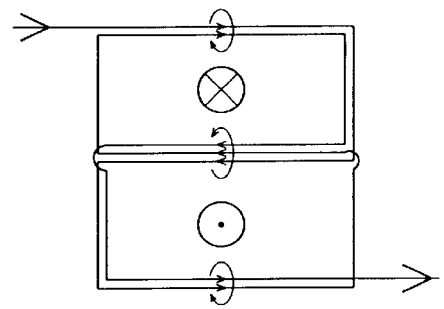
Figure 5C:
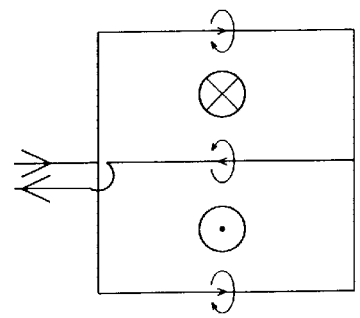
Figure 5D:
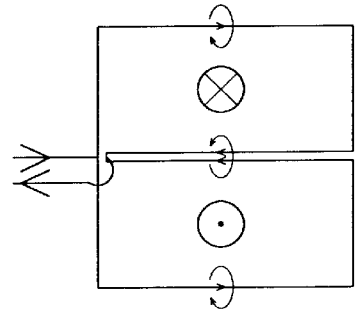
Figure 5E:
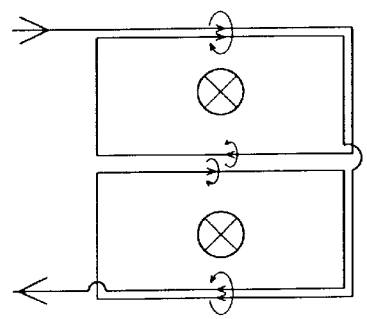

In FIG. 4, for the sake of easier comprehension, only a single conductor track of the various conductor track units or exciting units E1–E3 is shown in each case. Also shown in FIG. 4 are the respective current direction in the various conductor tracks and the supply voltage pickups $U_E$.

Because of the conductor track course chosen in the exemplary embodiment, the radially outermost exciting element E1 and the radially innermost exciting element E3 have a flow of current through them in the same direction. Conversely, the middle of the three exciting elements E2, which is disposed between the two scanning tracks A1 and A2 on the carrier element, has a flow of current through it in the opposite direction. A tubular or cylindrically oriented electromagnetic field develops in each case around the conductor tracks of the exciting elements E1–E3, and the resultant field directions are also shown in FIG. 4. Accordingly the field of both the first and the third conductor tracks is oriented in the same direction, while the field in the middle between these two conductor tracks is oriented in the opposite direction. In the regions located between the conductor tracks, having the scanning tracks A1 and A2, a homogeneous electromagnetic field in a defined spatial direction thus results, which is composed of the two fields of the adjacent exciting elements E1–E3 and is oriented either in the direction of the plane of the drawing, as in the case of the scanning track A1, or out of the plane of the drawing, as in the case of the scanning track A2. The corresponding field directions in the two scanning tracks A1 and A2 are each indicated in FIG. 4.

Alternative variants for the possible conductor track course in the case of two adjacent scanning tracks are also shown schematically in FIGS. 5a–5e. From the examples shown there, it can also be seen that the principles of the invention can also be employed at any time in linear measuring arrangements. FIGS. 5a–5d each show possibilities in which the middle conductor track unit in each case generates an oppositely oriented field from the fields of the two outer conductor track units. In the two scanning tracks, accordingly the result is always a conversely oriented, homogeneous electromagnetic field in the directions indicated. As an alternative to this, it is provided in the exemplary embodiment of FIG. 5e that the middle conductor track unit between the two scanning tracks be operatively split into two partial conductor track units. The two partial conductor track units have a flow of current through them in opposite directions, but as in the previously described variants it is again true that the conductor track units disposed immediately adjacent a scanning track generate oppositely oriented fields, which are superimposed on one another in the region of the scanning track to make a homogeneous field of a defined direction.

As already indicated in the description of the scale disk, there are naturally still other possibilities for the scanning element of arranging a plurality of scanning tracks on it. For instance, more than two scanning tracks may also be provided, each of which have sensor windings with different periodicities, etc. For such arrangements as well, it is possible on the basis of the concepts of the invention to assure the generation of homogeneous exciting fields by means of the appropriate design and arrangement of the exciting elements.

Figure 6:
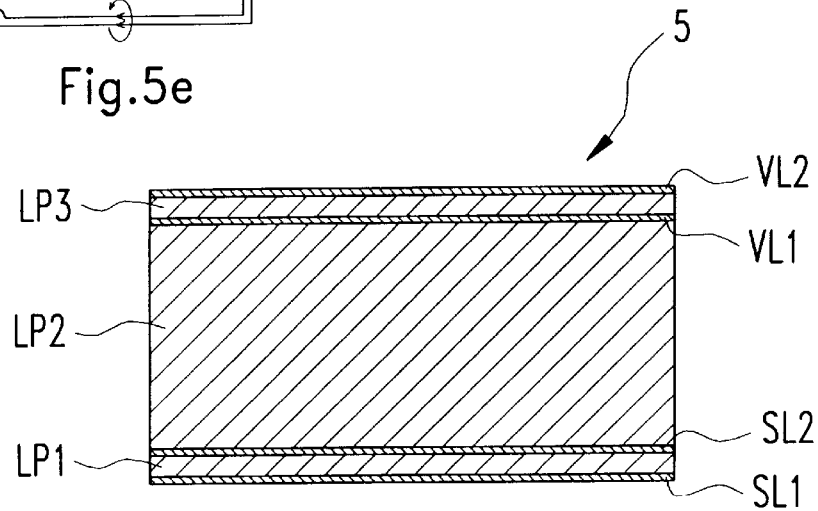
FIG. 6 shows a cross-sectional view through the scanning element of FIG. 2.

The appropriate course of the various conductor tracks required for the sensor windings and for the exciting elements on the scanning element can advantageously be achieved by means of a multilayer technique, as it is known for instance from printed circuit board technology. To explain the construction of the scanning element in such a multilayer technique, FIG. 6 shows a cross section of the scanning element of FIG. 2.

The scanning element 5 of the exemplary embodiment described has a seven-layer construction. A first sensor layer SL1 here faces the scale disk, not shown in FIG. 6, and this sensor layer is separated from a second sensor layer SL2 by a thin first printed circuit board layer LP1. Some of the exciting elements and some of the various sensor windings are each disposed in each of the two sensor layers SL1, SL2. Distributing both the exciting elements and the sensor windings among the two sensor layers SL1, SL2 proves to be advantageous for the sake of avoiding undesired crossings of lines. In the case of the first printed circuit board layer LP1, disposed between the two sensor layers, care must be taken that it be embodied as thin as possible, in the range of 1/10th of a millimeter, for instance, in order to assure that in particular the sensor windings disposed in the various sensor layers SL1, SL2 will be influenced in the same way by the scale regions of the scale disk.

Over the second sensor layer SL2, a thicker, second printed circuit board layer LP2 is provided, which essentially serves the purpose of mechanically stabilizing the scanning element 5 and is embodied as approximately 1 to 2 mm thick. Over this in turn are two connecting layers VL1, VL2, which are separated from one another by a third printed circuit board layer LP3. The various conductor tracks, which are required to supply the exciting elements, connect the exciting elements, pick up signals, etc., are laid in the connecting layers VL1, VL2. The two-layer embodiment of the connecting layers VL1, VL2 in turn makes the requisite crossing-free course of such connecting lines possible.

The scanning element embodied according to the invention can be manufactured economically with this kind of multilayer construction using known printed circuit board technologies.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A position measuring instrument comprising:
   a scale;
   a scanning element moving relative to said scale, said scanning element comprising:
      a first scanning track disposed within a first region, wherein said first scanning track comprises a sensor winding;
      a second scanning track disposed adjacent to said first scanning track within a second region, wherein said second scanning track comprises a second sensor winding that has a different periodicity than said first sensor winding;
      an electromagnetic field generator for generating a homogeneous electromagnetic exciting field within said first region and said second region that is directed toward said scale so as to scan said scale, wherein said electromagnetic field generator comprises an exciting element that comprises a first conductor track having a first current flowing therein and a second conductor track having a second current flowing therein and arranged parallel with respect to each other, wherein all conductor tracks of said exciting element have currents that flow in the same direction.

2. The position measuring instrument of claim 1, wherein said first region is annular in shape.

3. The position measuring instrument of claim 2, wherein said second region is annular in shape.

4. The position measuring instrument of claim 3, wherein said second region is concentric with said first region.

5. The position measuring instrument of claim 1, wherein said exciting element is disposed adjacent to said first scanning track.

6. The position measuring instrument of claim 5, wherein said electromagnetic field generator comprises a second exciting element disposed adjacent to said second scanning track.

7. The position measuring instrument of claim 6, wherein said electromagnetic field generator comprises a third exciting element that is disposed adjacent to both said first scanning track and said second scanning track.

8. The position measuring instrument of claim 1, wherein said exciting element is disposed adjacent to both said first scanning track and said second scanning track.

9. The position measuring instrument of claim 1, wherein said electromagnetic field generator comprises a conductor track unit in which a tubular electromagnetic field develops around said conductor track unit.

10. The position measuring instrument of claim 5, wherein a tubular electromagnetic field develops around said first exciting element.

11. The position measuring instrument of claim 6, wherein a tubular electromagnetic field develops around said first exciting element and a second tubular electromagnetic field develops around said second exciting element.

12. The position measuring instrument of claim 7, wherein a tubular electromagnetic field develops around said exciting element, a second tubular electromagnetic field develops around said second exciting element and a third tubular electromagnetic field develops around said third exciting element.

13. The position measuring instrument of claim 5, wherein said exciting element comprises a conductor track unit with a conductor track in which a current flows so as to generate a tubular electromagnetic field around said conductor track unit.

14. The position measuring instrument of claim 6, wherein said exciting element comprises a conductor track unit with a conductor track in which a current flows so as to generate a tubular electromagnetic field around said conductor track unit; and
   wherein said second exciting element comprises a second conductor track unit with a second conductor track in which a current flows so as to generate a tubular electromagnetic field around said second conductor track unit.

15. The position measuring instrument of claim 7, wherein said exciting element comprises a conductor track unit with a conductor track in which a current flows so as to generate a tubular electromagnetic field around said conductor track unit;
   wherein said second exciting element comprises a second conductor track unit with a second conductor track in which a current flows so as to generate a tubular electromagnetic field around said second conductor track unit; and
   wherein said third exciting element comprises a third conductor track unit with a third conductor track in which a current flows so as to generate a tubular electromagnetic field around said third conductor track unit.

16. The position measuring instrument of claim 14, wherein said first and second conductor tracks are interconnected such that the current direction in the first and second conductor tracks is oriented in the same direction so that said homogeneous electromagnetic exciting field develops in a defined spatial direction.

17. The position measuring instrument of claim 15, wherein said first, second and third conductor tracks are interconnected such that the current direction in the conductor tracks of adjacent conductor track units is oriented in the opposite direction so that said homogeneous electromagnetic exciting field develops within said first and second regions in a defined spatial direction.

18. A position measuring instrument comprising:
   a scale;
   a scanning element moving relative to said scale, said scanning element comprising:
      a first scanning track disposed within a first region; a second scanning track disposed adjacent to said first scanning track within a second region;
      an electromagnetic field generator for generating a homogeneous electromagnetic exciting field within said first region and said second region that is directed toward said scale so as to scan said scale, wherein said electromagnetic field generator comprises an exciting element comprising a first conductor track having a first current flowing therein and a second conductor track having a second current flowing therein and arranged parallel with respect to each other, wherein all conductor tracks of said exciting element have currents that flow in the same direction and
      wherein said first scanning track, said second scanning track and said electromagnetic field generator are disposed on a multilayered carrier element that comprises a first sensor layer into which said first sensor track is disposed and a second sensor layer into which said second sensor track is disposed.

19. The position measuring instrument of claim 18, wherein said scale comprises:
   a first scale track comprising an electrically conductive scale region and an electrically non-conductive scale region; and
   a second scale track comprising a periodic succession of a plurality of electrically conductive scale regions and non-conductive scale regions; and
   wherein said first scanning track comprises a first sensor winding and a second sensor winding disposed within a first region for scanning said first scale track, and wherein said second scanning track is disposed within a second region for scanning said second scale track, wherein said second scanning track comprises a third sensor winding that generates an absolute position signal and has a different periodicity than said first and second sensor windings.

20. The position measuring instrument of claim 18, comprising two sensor windings associated with said first scanning track wherein said two sensor windings generate at least two phase-offset, periodically modulated output signals when said scanning element is displaced relative to a scale.

21. The position measuring instrument of claim 20, wherein said output signals are out of phase by 90 degrees.

22. The position measuring instrument of claim 18, wherein said carrier element is embodied in the form of a thin circular disk, and said first and scanning tracks are disposed in circles on said disk.

23. A position measuring instrument comprising:
   a scale comprising:
      a first scale track comprising an electrically conductive scale region and an electrically non-conductive scale region; and
      a second scale track comprising a periodic succession of a plurality of electrically conductive scale regions and non-conductive scale regions;
   a scanning element moving relative to said scale, said scanning element comprising:
      a first scanning track comprising a first sensor winding and a second sensor winding disposed within a first region for scanning said first scale track;
      a second scanning track disposed within a second region for scanning said second scale track, wherein said second scanning track comprises a third sensor winding that generates an absolute position signal and has a different periodicity than said first and second sensor windings;
      an electromagnetic field generator for generating a homogeneous electromagnetic exciting field within said first region and said second region that is directed toward said scale so as to scan said scale, wherein said electromagnetic field generator comprises exciting elements disposed both laterally adjacent and between said first and second scanning tracks;
   wherein each of said exciting elements comprises a conductor track unit, comprising a plurality of parallel individual conductor tracks, which are interconnected in such a way that all of the conductor tracks of said conductor track unit have current flowing through them in the same direction; and
   wherein said conductor track unit is disposed between an inner conductor track unit and an outer track unit, wherein said inner and outer conductor track units each have current flowing through them in the same direction, while said conductor track unit has current flowing through it in the opposite direction, so that said first and second scanning tracks, in each case an oppositely oriented electromagnetic exciting field results.

24. A position measuring instrument for generating position-dependent outputs signals, said instrument comprising:
   a scale comprising:
      a first scale track comprising an electrically conductive scale region and an electrically non-conductive scale region; and
      a second scale track comprising a periodic succession of a plurality of electrically conductive scale regions and non-conductive scale regions;
   a scanning element moving relative to said scale, said scanning element comprising:
      a first scanning track comprising a first sensor winding and a second sensor winding disposed within a first region for scanning said first scale track;
      a second scanning track disposed within a second region for scanning said second scale track, wherein said second scanning track comprises a third sensor winding that generates an absolute position signal and has a different periodicity than said first and second sensor windings; and
   an electromagnetic field generator for generating a homogeneous electromagnetic exciting field within said first region and said second region that is directed toward said scale so as to scan said scale, wherein said electromagnetic field generator comprises an exciting element comprising a first conductor track having a first current flowing therein and a second conductor track having a second current flowing therein and arranged parallel with respect to each other, wherein all conductor tracks of said exciting element have currents that flow in the same direction.

25. The position measuring instrument of claim 24, wherein said scale comprises at least one scale track with alternatingly arranged electrically conductive and nonconductive scale regions.

26. The position measuring instrument of claim 25, wherein said at least one scale track is circular.

27. The position measuring instrument of claim 25, wherein said first scale track comprises a periodic succession of a plurality of electrically conductive scale regions and nonconductive scale regions.

28. The position measuring instrument of claim 27, wherein said second scale track comprises an electrically conductive circle segment and one nonconductive circle segment.

29. The position measuring instrument of claim 24, wherein said first region is annular in shape.

30. The position measuring instrument of claim 29, wherein said second region is annular in shape.

31. The position measuring instrument of claim 30, wherein said second region is concentric with said first region.

32. The position measuring instrument of claim 24, wherein said exciting element is disposed adjacent to said first scanning track.

33. The position measuring instrument of claim 32, wherein said electromagnetic field generator comprises a second exciting element disposed adjacent to said second scanning track.

34. The position measuring instrument of claim 33, wherein said electromagnetic field generator comprises a third exciting element that is disposed adjacent to both said first scanning track and said second scanning track.

35. The position measuring instrument of claim 24, wherein said electromagnetic field generator comprises a conductor track unit in which a tubular electromagnetic field develops around said conductor track unit.

36. The position measuring instrument of claim 32, wherein a tubular electromagnetic field develops around said exciting element.

37. The position measuring instrument of claim 33, wherein a tubular electromagnetic field develops around said first exciting element and a second tubular electromagnetic field develops around said second exciting element.

38. The position measuring instrument of claim 34, wherein a tubular electromagnetic field develops around said first exciting element, a second tubular electromagnetic field develops around said second exciting element and a third tubular electromagnetic field develops around said third exciting element.

39. The position measuring instrument of claim 32, wherein said exciting element comprises a conductor track unit with a conductor track in which a current flows so as to generate a tubular electromagnetic field around said conductor track unit.

40. The position measuring instrument of claim 33, wherein said exciting element comprises a conductor track unit with a conductor track in which a current flows so as to generate a tubular electromagnetic field around said conductor track unit; and wherein said second exciting element comprises a second conductor track unit with a second conductor track in which a current flows so as to generate a tubular electromagnetic field around said second conductor track unit.

41. The position measuring instrument of claim 34, wherein said exciting element comprises a conductor track unit with a conductor track in which a current flows so as to generate a tubular electromagnetic field around said conductor track unit;

wherein said second exciting element comprises a second conductor track unit with a second conductor track in which a current flows so as to generate a tubular electromagnetic field around said second conductor track unit; and wherein said third exciting element comprises a third conductor track unit with a third conductor track in which a current flows so as to generate a tubular electromagnetic field around said third conductor track unit.

42. The position measuring instrument of claim 40, wherein said first and second conductor tracks are interconnected such that the current direction in the first and second conductor tracks is oriented in the same direction so that said homogeneous electromagnetic exciting field develops in a defined spatial direction.

43. The position measuring instrument of claim 41, wherein said first, second and third conductor tracks are interconnected such that the current direction in the conductor tracks of adjacent conductor track units is oriented in the opposite direction so that said homogeneous electromagnetic exciting field develops within said first and second regions in a defined spatial direction.

44. A position measuring instrument, which is used to generate position-dependent output signals in inductive scanning of at least one scale track of a scale, said position measuring instrument comprises:

a scale comprising a scale track that comprises alternatingly arranged electrically conductive and nonconductive scale regions;

a scanning element moving relative to said scale, said scanning element comprising:

a multi-layer carrier element on which a plurality of exciting elements for generating a homogeneous exciting field that is directed toward said scale so as to scan said scale, wherein at least one of said plurality of exciting elements has a first portion located in a first layer at a first level and a second portion located in a second sensor layer that is at a second level that is further from said scale than said first level;

wherein disposed on said carrier element are at least a first scanning track and an adjacent second scanning track with sensor windings of different periodicity that sense an electromagnetic field generated by said electrically conductive scale regions in response to receiving said exciting field, and wherein said plurality of exciting elements are each disposed laterally adjacent said scanning tracks and each of said plurality of exciting elements comprises a first conductor track having a first current flowing therein and a second conductor track having a second current flowing therein and arranged parallel with respect to each other, wherein all conductor tracks of said plurality of exciting elements have currents that flow in the same direction, so that the homogeneous electromagnetic exciting field develops in the region of each of said scanning tracks.

45. The position measuring instrument of claim 44, wherein said plurality of exciting elements are embodied as conductor track units, each of which includes said first conductor track and said second conductor track through which electric current flows and which are disposed plane parallel on said carrier element, so that a tubular electromagnetic field develops around said respective conductive track units.

46. The position measuring instrument of claim 44, wherein said first and second conductor tracks of said plurality of exciting elements are interconnected such that the current direction in said conductor tracks of adjacent conductor track units is oriented in the same direction in each case, and between said adjacent conductor track units, the region of said scanning tracks, a homogeneous electromagnetic field in a defined spatial direction develops.

47. The position measuring instrument of claim 44, wherein parts of said sensor windings are disposed in said first sensor layer and said second sensor layer.

48. The position measuring instrument of claim 44, wherein said scale comprises a second scale track that comprises an electrically conductive and an electrically non-conductive scale region; and
wherein said first scanning track comprises a first sensor winding and a second sensor winding disposed within a first region for scanning said second scale track, and said second scanning track disposed within a second region for scanning said first scale track, wherein said second scanning track comprises a third sensor winding that generates an absolute position signal and has a different periodicity than said first and second sensor windings.

49. The position measuring instrument of claim 44, wherein said scanning tracks has at least two sensor windings disposed relative to one another on said carrier element, so that on the output side of each scanning track at least two phase-offset, periodically modulated output signals result in the displacement of said scanning element and scale tracks.

50. The position measuring instrument of claim 44, wherein said carrier element is embodied in the form of a thin circular disk, and both said scanning tracks and said plurality of exciting elements are disposed in circles on it.

51. The position measuring instrument of claim 45, comprising a first absolute scanning track comprises an electrically conductive circle element and a nonconductive circle element and a second incremental scanning track disposed radially adjacent one another on said carrier element and comprising a periodic succession of a plurality of electrically conductive scale regions and nonconductive scale regions, and both laterally adjacent and between said two scanning tracks, and
wherein said conductor track units are disposed in the form of exciting elements for generating a homogeneous electromagnetic exciting field in the region of said scanning tracks.

52. The position measuring instrument of claim 49, comprising a first absolute scanning track comprises an electrically conductive circular element and a nonconductive circular element and a second incremental scanning track disposed radially adjacent one another on said carrier element and comprising a periodic succession of a plurality of electrically conductive scale regions and nonconductive scale regions, and both laterally adjacent and between two of said plurality of exciting elements, and
wherein said conductor track units are disposed in the form of exciting elements for generating a homogeneous electromagnetic exciting field in the region of said scanning tracks.

53. The position measuring instrument of claim 50, comprising a first absolute scanning track comprises an electrically conductive circular element and a nonconductive circular element and a second incremental scanning track disposed radially adjacent one another on said carrier element and comprising a periodic succession of a plurality of electrically conductive scale regions and nonconductive scale regions, and both laterally adjacent and between two of said plurality of exciting elements, and
wherein said conductor track units are disposed in the form of exciting elements for generating a homogeneous electromagnetic exciting field in the region of said scanning tracks.

54. The position measuring instrument of claim 51, wherein said first conductor track and said second track of said conductor track units are interconnected in such a way that the first and second conductor tracks of a conductor track unit have current flowing through them in the same direction.

55. The position measuring instrument of claim 54, wherein said conductor track units are interconnected in such a way that the inner and outer conductor track units each have current flowing through them in the same direction, while the middle conductor track unit has current flowing through it in the opposite direction, so that in said two scanning tracks, in each case an oppositely oriented electromagnetic exciting field results.

56. The position measuring instrument of claim 50, wherein at least one scanned, circularly embodied scale track is disposed on a circular scale carrier.

57. A position measuring instrument for generating position-dependent output signals by inductive scanning of at least one scale track with alternatingly arranged electrically conductive and nonconductive scale regions, said position measuring instrument comprising:
a scanning element comprising:
a multi-layer carrier element on which a plurality of exciting elements for generating a homogeneous exciting field that is directed toward said scale so as to scan said at least one scale track, wherein at least one of said plurality of exciting elements has a first portion located in a first layer at a first level and a second portion located in a second sensor layer that is at a second level that is further from said scale than said first level;
wherein disposed on said carrier element are at least a first scanning track and a second adjacent scanning track with sensor windings of different periodicity that sense an electromagnetic field generated by said at least one scale track in response to receiving said exciting field; and
wherein said exciting elements are each disposed laterally adjacent said scanning tracks and each of said exciting elements comprises a first conductor track having a first current flowing therein and a second conductor track having a second current flowing therein and arranged parallel with respect to each other, wherein all conductor tracks of said exciting elements have currents that flow in the same direction, so that the homogeneous electromagnetic exciting field develops in the region of each of said scanning tracks.

58. The position measuring instrument of claim 57, wherein at least one scanned, circularly embodied scale track is disposed on a circular scale carrier.

59. The position measuring instrument of claim 58, wherein on said circular scale carrier, there are first and second radially adjacent scale tracks, of which said first scale track comprises a periodic succession of a plurality of electrically conductive scale regions and nonconductive scale regions while said second scale track comprises one electrically conductive circle segment and one nonconducting circle segment; and wherein said first scanning track comprises a first sensor winding and a second sensor winding disposed within a first region for scanning said second scale track, and said second scanning track disposed within a second region for scanning said first scale track, wherein said second scanning track comprises a third sensor winding that generates an absolute position signal and has a different periodicity than said first and second sensor windings.

60. The position measuring instrument of claim 44, wherein said first conductor track of said at least one of said plurality of exciting elements has a first portion in said first layer and a second portion in said second layer.

61. The position measuring instrument of claim 60, wherein said second conductor track of said at least one of said plurality of exciting elements has a first portion in said first layer and a second portion in said second layer.

62. The position measuring instrument of claim 57, wherein said first conductor track of said at least one of said plurality of exciting elements has a first portion in said first layer and a second portion in said second layer.

63. The position measuring instrument of claim 62, wherein said second conductor track of said at least one of said plurality of exciting elements has a first portion in said first layer and a second portion in said second layer.

* * * * *

UNITED STATES PATENT AND TRADEMARK OFFICE
CERTIFICATE OF CORRECTION

PATENT NO. : 6,111,402
DATED : August 29, 2000
INVENTOR(S) : Peter Fischer

Page 1 of 1

It is certified that error appears in the above-identified patent and that said Letters Patent is hereby corrected as shown below:

Claim 10,
Line 3, delete "first".

Claim 11,
Line 3, delete "first".

Claim 22,
Line 3, change "first and scanning" to -- first and second scanning --.

Claim 37,
Line 3, delete "first".

Claim 38,
Line 3, delete "first".

Claim 49,
Line 2, after "wherein" insert -- each of --.

Signed and Sealed this

Nineteenth Day of February, 2002

Attest:

Attesting Officer

JAMES E. ROGAN
*Director of the United States Patent and Trademark Office*